United States Patent [19]

Fischman et al.

[11] 3,764,737

[45] Oct. 9, 1973

[54] SINGLE RAMP FILM AND TV RECEIVER APPARATUS

[75] Inventors: Martin Fischman, Wantagh; William D. Murphy, Seneca Falls, both of N.Y.

[73] Assignee: GTE Sylvania Incorporated, Seneca Falls, N.Y.

[22] Filed: Jan. 17, 1972

[21] Appl. No.: 218,361

[52] U.S. Cl. .......................... 178/7.2, 178/DIG. 28
[51] Int. Cl. .......................... H04n 5/36
[58] Field of Search .......................... 178/DIG. 28, 6.7 A, 178/5.4 CD, 5.2 D, 7.2

[56] References Cited

UNITED STATES PATENTS 3,621,121 11/1971 Eckenbrecht .................. 178/5.2 D
3,333,058 7/1967 Goldmark .................. 178/DIG. 28

*Primary Examiner*—Howard W. Britton
*Attorney*—Norman J. O'Malley et al.

[57] ABSTRACT

Apparatus is provided for generating a single ramp signal which is employed to vertically alter electron beam scanning of a flying spot scanner system. The ramp signal has a slope proportional to the rate of film frame movement through a film scanning zone and sequences at a time substantially coincident with a retrace period of a vertical scan signal of a visual display device.

9 Claims, 3 Drawing Figures

SINGLE RAMP FILM AND TV RECEIVER APPARATUS

CROSS-REFERENCE TO OTHER APPLICATIONS

Apparatus for effecting continuous modification of electron beam scanning of film frame movement through a film scanning zone is set forth in U.S. Pat. Nos. 3,619,483 and 3,621,121 which are assigned to the assignee of the present application. Also, a dual ramp system for effecting the above-mentioned continuous modification of electron beam scanning is provided in U.S. Pat. No. 3,604,850 and U.S. Pat. application No. 163,253 filed July 16, 1971, entitled "Film Originated Color Television Signal Development Apparatus," and assigned to the assignee of the present application.

BACKGROUND OF THE INVENTION

In a preferred embodiment, a single ramp signal having a slope substantially proportional to the rate of film frame movement through a film scanning zone is employed to alter the vertical electron beam scanning of a flying spot scanner system. This vertical alteration is synchronized with the normal vertical scanning of a television receiver such that image information derived from film is suitable for display on a television receiver.

As is well known, the non-compatibility of vertical scanning rates of television receivers and the frame rates of moving films have long presented a problem of synchronization. Thus, known systems include both intermittent and continuous film motion as well as both optical and electronic scanning control.

More specifically, known intermittent scan systems include so-called overscan, altered scan, and fast pull-down techniques. Overscan utilizes a horizontal overscan period in combination with an ordinary scan retrace period in an effort to provide sufficient time for film movement without observation of the movement by a viewer of a TV receiver. Altered scan provides a modified vertical scan waveform related to the movement of the film. Fast pull-down attempts to rapidly move the film during a period of scan retrace.

Continuous scanning systems include optical systems such as the so-called lap-dissolve technique of gradual appearing and disappearing scenes, as well as numerous forms of prisms and mirror structures for effecting immobilization of the film. Moreover, continuous scanning systems employing electronic scanning may be of a single continuous ramp type as set forth in U.S. Pat. Nos. 3,619,483 and 3,621,121 or of a dual ramp type as set forth in U.S. Pat. No. 3,604,850. Although all of the above-mentioned systems have been or still are employed with varying degrees of success and satisfaction, each has one or more features which leaves something to be desired. For instance, many intermittent systems tend to be undesirably noisy and exert a severe strain on the film. Also, continuous systems employing optics appear to be relatively expensive and usually provide several optical paths which are difficult to control and coordinate to provide a uniform result.

Also, continuous scanning systems utilizing electronic scanning appear to provide enhanced capabilities for synchronized film and television receiver scanning. However, even with such an improved technique there are instances where one form of apparatus is preferable and minimum cost always remains a goal to be achieved.

OBJECTS AND SUMMARY OF THE INVENTION

An object of the present invention is to provide an enhanced system for developing signals from film, suitable for display on a television receiver. Another object of the invention is to provide apparatus for improved synchronization of film and television receiver scanning. Still another object of the invention is to provide improved apparatus for developing vertical scan modification signals suitable for use in a flying spot scanner system. A further object of the invention is to provide inexpensive and relatively simple apparatus for developing a single ramp signal for vertically modifying an electron beam in accordance with a continuously moving film of film frames.

These and other objects, advantages and capabilities are achieved in one aspect of the invention by a film scanning system wherein apparatus is provided for developing a single ramp signal having a slope substantially proportional to the rate of film frame movement through a film scanning zone of a flying spot scanner system, and a resultant signal bearing image information derived from the film and in a form suitable for display on a television receiver is provided.

PREFERRED EMBODIMENT OF THE INVENTION

For a better understanding of the present invention, together with other and further objects, advantages and capabilities thereof, reference is made to the following disclosure and appended claims in connection with the above-mentioned drawings.

Figure 1:
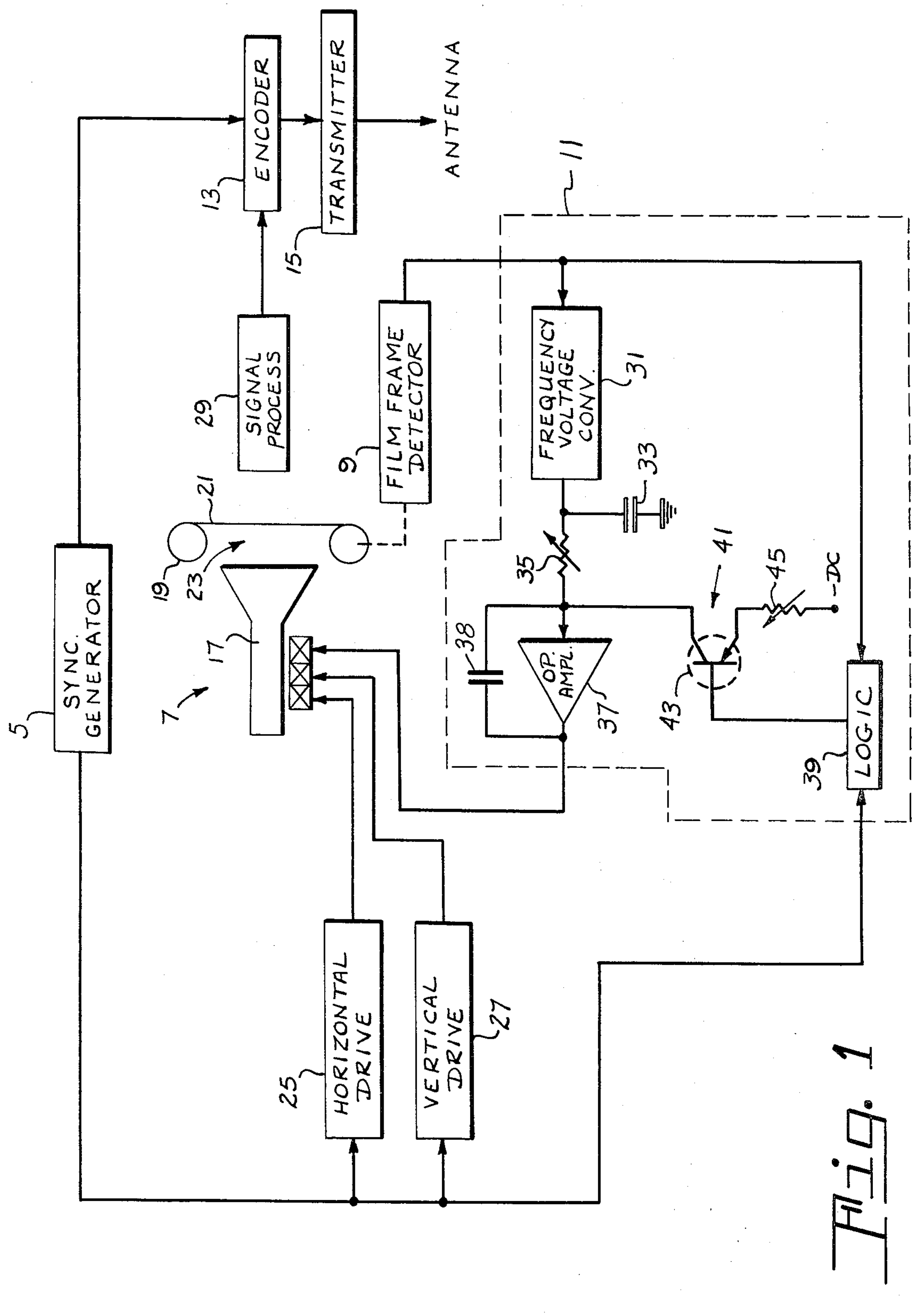
FIG. 1 is an illustration, in block and schematic form, of apparatus suitable for developing a single ramp signal to effect modification of scanning of a continuously moving film of film frames.

Referring to the drawings, FIG. 1 illustrates a single ramp type apparatus for utilizing images derived from film for display on a television receiver. The apparatus includes a synchronizing signal generator 5 with a flying spot scanner system 7 coupled thereto. A film frame detector 9 is associated with the scanner system 7 and a vertical signal modification means 11 is responsive to signals from the signal generator 5 and film frame detector 9 to effect alteration of the vertical scanning of the flying spot scanner system 7. A signal encoder 13 is coupled to the signal generator 5 and provides signals for a transmitter 15 wherein a transmittable signal suitable for use by a television receiver is provided.

More specifically, the flying spot scanner system 7 includes a flying spot scanner tube 17 with an adjacent transport means 19 for continuously conveying a film 21 of film frames through a film scanning zone 23. Also, the scanner tube 17 is coupled via horizontal and vertical drive circuitry, 25 and 27 to the synchronizing signal generator 5. A signal processing stage 29 is disposed adjacent the film 21 and on a side opposite to the scanner tube 17.

An encoder 13 is coupled to the synchronizing signal generator 5 and the signal processing stage 29 and serves to process image information derived from the film 21 as well as synchronizing information to provide signals which are applied to a transmitter 15. In turn, the transmitter 15 provides a television signal containing image information derived from the film 21 and suitable for reception by a television receiver to provide a visual display of the image information.

Also, a film frame detector 9 is associated with the transport means 19 of the scanner system 7 and provides a signal representative of the positional location of a film frame of the continuously moving film 21. Moreover, the signals from the film frame detector 9 are representative of the rate at which a film frame is moved through the film scanning zone 23.

Coupled to the film frame detector 9 and to the synchronizing signal generator 5 is the vertical signal modification means 11. This vertical signal modification means 11 includes a ramp signal generating means having a frequency-to-voltage converter 31 coupled to the film frame detector 9 and via a capacitor 33 to a potential reference level such as circuit ground. An alterable resistor 35 couples the frequency-to-voltage converter 31 and capacitor 33 to an operational amplifier 37 shunted by a capacitor 38 which, in turn, is coupled to the scanner tube 17 of the flying spot scanner system 7.

Also, the vertical signal modification means 11 includes a ramp signal altering means having logic circuitry 39 coupled via a constant current generator 41 to the junction of the alterable resistor 35 and operational amplifier 37. The logic circuitry 39 is coupled and responsive to signals from the film frame detector 9 as well as the synchronizing signal generator 5. Also, the constant current generator 41 includes an electron device 43 with a first input electrode coupled to the logic circuitry 39, a second input electrode coupled via an adjustable impedance 45 to a DC potential source, and an output electrode coupled to the operational amplifier 37 and alterable resistor 35.

As to operation, the horizontal and vertical drive circuitry, 25 and 27, provide deflection signals at horizontal and vertical frequencies in response to a synchronizing signal from the signal generator 5 to cause horizontal and vertical scanning of the electron beam of the flying spot scanner tube 17. In turn, the flying spot scanner tube 17 provides a light source which scans a film frame of the film 21 and provides image information for the signal processing stage 29.

The film frame detector 9, upon activation of the film transport 19, provides an electrical signal which is derived from the film 21 and representative of the film frame passage through the film scanning zone. This electrical signal is applied to the frequency-to-voltage converter 31 to provide a potential representative of the film frame frequency which is applied to the and alterable resistor 35 to provide a signal potential having a magnitude dependent upon the time constant of the circuitry. This signal potential, which tends to have a substantially non-linear characteristic is applied to a compensated operational amplifier 37 to provide a substantially linear single ramp signal.

Also, the film frame detector 9 provides an electrical signal derived from the film 21 which is applied to the logic circuitry 39. A signal from the synchronizing signal generator 5 is also applied to the logic circuitry 39 which is set-up or "readied" by the signal from the film frame detector 9 and activated by a next following signal from the signal generator 5. Thereupon, a discharge path for the ramp signal is provided by the constant current generator 41 to provide a discharge of the ramp signal in an amount substantially equal to the height of a single frame of the film 21. Thus, a vertical scan signal available from the sync generator 5 and immediately following a signal from the film frame detector 9 causes discharge of the single ramp signal in an amount substantially equal to a film frame height and at a time of the vertical scan retract of the scanner tube 17.

Figure 2:
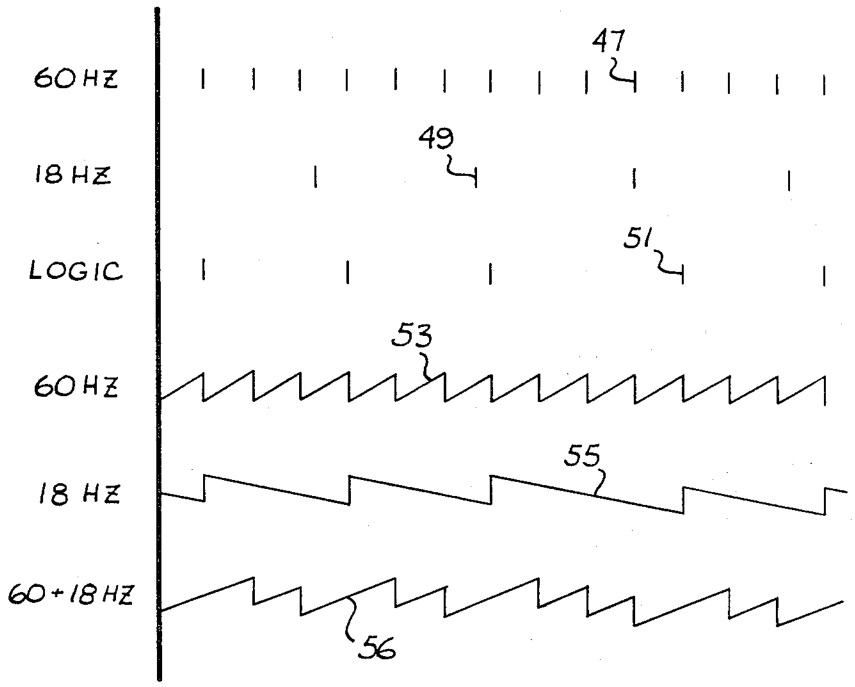
FIG. 2 is a graphic illustration of the development of a resultant signal for effecting synchronized scanning of a film and of a television receiver.

To graphically illustrate the above description, FIG. 2 includes a first time chart 47 representation of a 60 Hz scanning frequency normally employed in television receivers. Also, it may be assumed that a film 21 of film frames is transported continuously through the film scanning zone 23 at an 18 Hz rate. Thus, the film frame detector 9 provides a signal, time chart 49, at the film frame frequency of 18 Hz. Moreover, the above-mentioned 18 Hz signal is applied to the logic circuitry, 39 of FIG. 1, to effect a "ready" condition and activated by a following 60 Hz signal. Thus, the logic circuitry 39 provides a logic signal as illustrated by the time chart 51.

Further, the sync signal generator 5 provides a signal which initiates the usual vertical scanning ramp-like signal 53. The film frame detector 9, in response to the speed of the film 21, activates the ramp signal generating means of the vertical signal modification means 11 of FIG. 1, and development of a ramp signal having a slope proportional to the film speed. Also, the ramp signal altering means of the vertical signal modification means provides the above-mentioned logic signal which effects discharge of the capacitor, 38 of FIG. 1, and alteration of the ramp signal at the period of retrace of the vertical scanning ramp signal 53, as illustrated by the vertical modification ramp signal 55. Thus, scanning of the flying spot scanner tube 17 is altered along a slope proportional to the film frame rate of the continuously moving film 21 and a resultant ramp-like signal 56.

Figure 3:
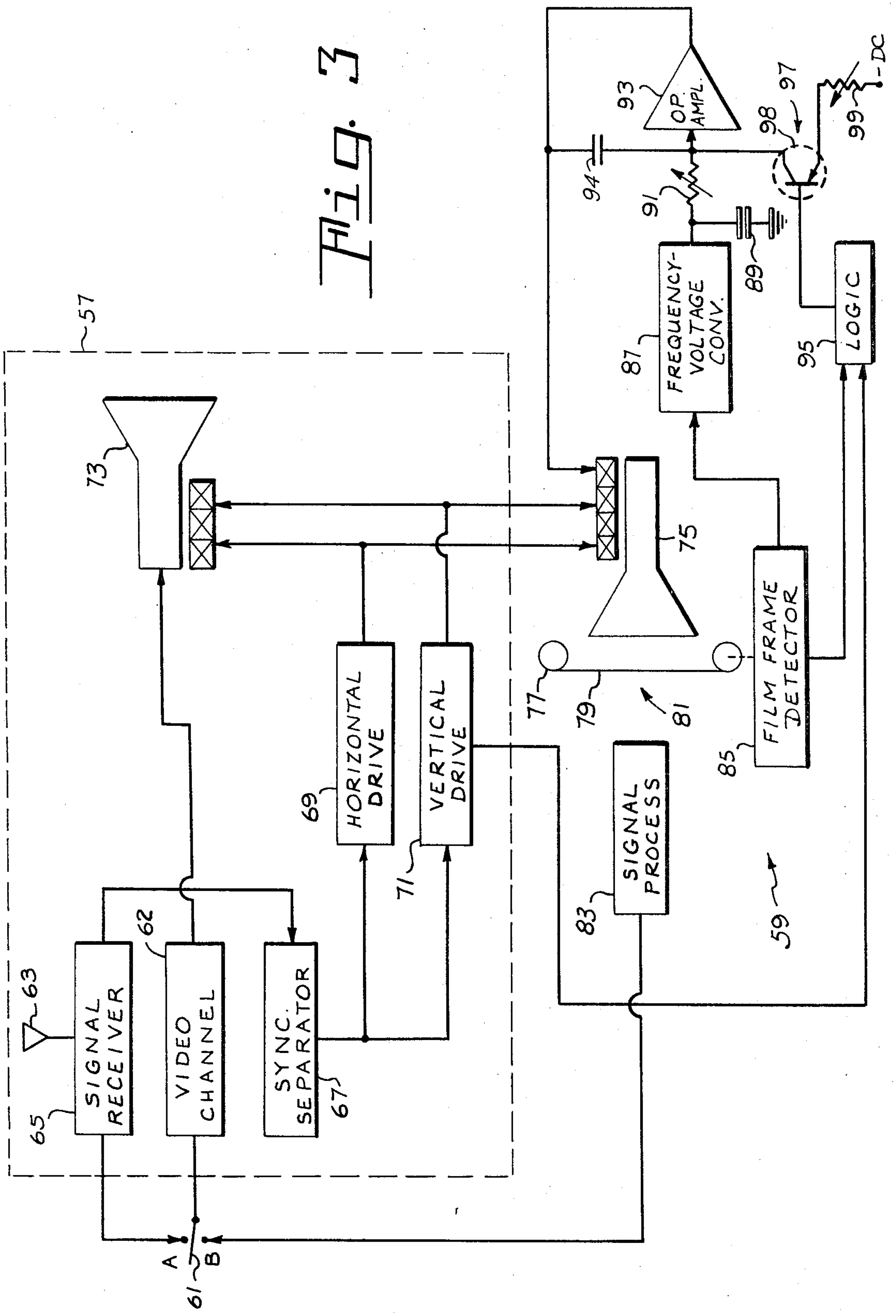
FIG. 3 is an alternate embodiment, in block and schematic form, of combined optical to electrical and electrical to optical signal transducers for effecting a television display derived from film or received television signals.

Alternatively, FIG. 3 illustrates a system utilizing a combined television receiver 57 and flying spot scanner system 59 wherein components are utilized in common. Also, a switching means 61 is employed for selective coupling of signals from the television receiver 57 and the flying spot scanner system 59.

More specifically, the television receiver 57 includes the usual antenna 63 coupled to an ordinary signal receiver 65. The signal receiver is coupled to the switching means 61, which will be explained hereafter, and to a sync separator stage 67. The sync separator stage 67 separates synchronizing signals from the received signal and activates horizontal drive circuitry 69 and vertical drive circuitry 71 at the usual horizontal scan frequency and the usual vertical scan frequency employed in television receivers. In turn, signals from the horizontal and vertical drive circuitry, 69 and 71, are applied to the display device or cathode ray tube apparatus 73 of the television receiver 57 and to the scanner tube apparatus 75 of the flying spot scanner system 59. Moreover, the signals from the vertical drive circuitry 71 are additionally employed in the flying spot scanner system 59 as will be explained hereinafter.

The flying spot scanner system 59 includes the abovementioned scanner tube apparatus 75 with an associated transport means 77 for continuously moving a film 79 of film frames through a film scanning zone 81. A signal processing stage 83 receives and processes signals representative of image information derived from the film 79 and applies these signals to the switching means 61 which selectively applies received signals via a video channel stage 62 to the cathode ray tube apparatus 73.

A film frame detector 85 is associated with the film 79 and provides a signal representative of a film frame of the film 79. The signal from the film frame detector 85 is applied to a ramp signal generating means including a frequency-to-voltage converter 87, a capacitor 89 coupling the converter 87 to circuit ground, and an adjustable resistor 91 coupling the converter 87 to a linear operational amplifier 93 shunted by a capacitor 94. The linear operational amplifier 93 is coupled to the scanner tube apparatus 75.

Also, the film frame detector 85 is coupled to logic circuitry 95 which also receives signals from the vertical drive circuitry 71 of the television receiver 57. The logic circuitry 95 is coupled by way of a constant current generator 97 to the operational amplifier 93 of the ramp signal generating means. Moreover, the constant current generator 97 includes an electron device 98 coupled to the logic circuitry 95, to the operational amplifier 93, and via an alterable impedance 99 to a DC potential source.

As to operation, the switching means 61 permits selection by a viewer of a display on a television receiver wherein the image information is derived from either transmitted signals or from film. Upon positioning the switching means 61 at a first location "A," a signal received by the antenna 63 is conveyed via the video channel 62 to the cathode ray tube apparatus 73 to provide an image display. Positioning the switching means 61 at a second location "B" provides image information from the signal processing stage 83 of the flying spot scanner system 59. Thus, image information derived from film is displayed on the same cathode ray tube apparatus 73.

As explained in the previously-mentioned embodiment of FIG. 1, a single ramp signal is developed in a ramp signal generating means which includes the frequency-to-voltage converter 87, charging capacitor 94, and resistor 91. The ramp signal has a slope proportional to the speed of a film frame and this ramp signal is altered by the ramp altering means including the logic circuitry 95 and constant current generator 97. Therefore, vertical alteration of electron beam scanning of the cathode ray tube apparatus 75 of the flying spot scanner system 59 is altered in accordance with the film speed and synchronized with the vertical scan frequency of the television receiver 57.

Thus, there has been provided a unique single ramp film apparatus wherein a flying spot scanner system utilizes a single ramp signal developed in response to signals representative of film frame speed and vertical scanning of a television receiver. The apparatus achieves vertical modification of electron beam scanning of a flying spot scanner tube and of a film such that image information is derived from a continuously moving film and the image information is processed in a manner such that signals suitable for effecting a television display are provided.

Also, there is provided a unique television receiver and flying spot scanner system wherein a single ramp signal development apparatus provides signals derived from film which are processed in a manner to provide a display by a television receiver. Moreover, the receiver is also capable of displaying image information derived from transmitted television signals in accordance with the preference of a receiver.

Further, the single ramp signal apparatus is relatively inexpensive, reliable, and simple whereupon signals suitable for television display and derived from film are readily obtained. The system is also applicable to varying film speed without deleterious effects upon the display and manual adjustment and compensation by a viewer.

While there have been shown and described what is at present considered the preferred embodiments of the invention, it will be obvious to those skilled in the art that various changes and modifications may be made therein without departing from the invention as defined by the appended claims.

What is claimed is:

1. Single ramp film apparatus for a flying spot scanner system employed with a television receiver comprising: synchronizing signal generating means;

flying spot scanner means coupled to said generating means and including horizontal and vertical scanning circuitry, a flying spot scanner tube, a film scanning zone, and transport means for continuously moving a film of film frames through said film scanning zone;

film frame detector means associated with said flying spot scanner means and providing a signal representative of a film frame in said film scanning zone; and vertical signal modification means coupled to said flying spot scanner means and including ramp signal generating means coupled to said film frame detector means and providing a substantially linear ramp signal having a slope substantially proportional to the rate of advancement of a film frame through said film scanning zone and coupled to said flying spot scanner tube and ramp signal altering means including logic circuitry responsive to signals from said synchronizing signal generating means and said film frame detector means and constant current generating means coupled to said logic circuitry and to said ramp signal generating means for effecting vertical alteration of said ramp signal in an amount substantially equal to the vertical height of a film frame, and at a period of vertical scanning retrace of said flying spot scanner tube whereby the scanning raster of the flying spot scanner tube is vertically varied in accordance with the vertical movement of a film frame through said film scanning zone.

2. The single ramp film apparatus of claim 1 including a signal processing means coupled to said flying spot scanner means for providing electrical signals representative of image information on said film, encoder means coupled to said signal processing means and said synchronizing signal generating means, and a transmitter means coupling said encoder means to an antenna for providing electrical signals suitable for television receiver reception and representative of image information on said film.

3. The single ramp film apparatus of claim 1 wherein said vertical signal modification means includes a ramp generating means in the form of a frequency to voltage converter coupled to said film frame detector, capacitor means coupling said converter to a potential reference level, and an alterable resistor and an operational amplifier shunted by a capacitor series connecting said converter to said flying spot scanner means.

4. The single ramp film apparatus of claim 1 wherein said constant current generator means is responsive to said logic circuitry for effecting a controlled discharge of said ramp generating means whereby a desired amount of vertical height modification of said ramp signal is attained during a period of vertical scan retrace of said flying spot scanner tube.

5. The single ramp film apparatus of claim 1 wherein said constant current generator includes an alterable impedance and an electron device series connected to a DC potential source and to said ramp signal generating means, said alterable impedance effecting magnitude control of said ramp signal alteration.

6. Single ramp film apparatus for a color television receiver and flying spot scanner system comprising:

a color television receiver including an image display device and signal receiving and processing apparatus having a signal receiver, a sync signal separator means and horizontal and vertical drive circuitry associated with said display device;

flying spot scanner means including a flying spot scanner tube, a film scanning zone associated with said tube, transport means for continuously moving a film of film frames through said film scanning zone, signal processing means associated with said scanner means, and means coupled to said horizontal and vertical drive circuitry of said receiver for effecting scanning of said flying spot scanner tube;

film frame detector means associated with said flying spot scanner means and providing a signal representative of a film frame in said film scanning zone;

vertical scan modification signal means including a ramp signal generating means coupled to said film frame detector means and a ramp signal altering means including logic circuitry coupled to said film frame detector means and said vertical drive circuitry of said receiver and constant current generating means coupled to said logic circuitry and to said ramp signal generating means for effecting vertical alteration of said ramp signal in an amount substantially equal to one film frame height; and switching means for selectively applying signals from said signal receiver of said television receiver and said signal processing means of said flying spot scanner means to said image reproducer to effect display of images derived from televised signals or film.

7. The single ramp film apparatus of claim 6 wherein said ramp signal generating means includes a frequency to voltage converter coupled to said film frame detector means, a capacitor coupling said converter to a potential reference level, and a series connected alterable resistor and operational amplifier shunted by a capacitor and coupling said converter to said flying spot scanner tube of said flying spot scanner means.

8. The single ramp film apparatus of claim 6 wherein said ramp signal altering means of said vertical scan modification signal means includes logic circuitry coupled to said film frame detector means and said vertical drive circuitry of said television receiver and a constant current generator responsive to signals from said logic circuitry for effecting alteration of said ramp signal generating means to cause vertical adjustment of said ramp signal in an amount substantially equal to the vertical height of a film frame.

9. The single ramp film apparatus of claim 8 wherein said constant current generator is in the form of an electron device having an output electrode coupled to said ramp signal generating means, an input circuit coupled to said logic circuitry and a second input circuit coupled via an alterable impedance to a DC potential means.

* * * * *